No. 673,431. Patented May 7, 1901.
H. FREDRICK.
WATER METER.
(Application filed Mar. 28, 1900.)

(No Model.) 3 Sheets—Sheet 1.

WITNESSES: INVENTOR
Henry Fredrick,
BY
Drake & Co.
ATTORNEYS

No. 673,431.  
H. FREDRICK.  
WATER METER.  
(Application filed Mar. 28, 1900.)  
Patented May 7, 1901.

(No Model.)

3 Sheets—Sheet 2.

WITNESSES:
Henry P King
Russell M. Everett

INVENTOR
Henry Fredrick,
BY
Drake & Co.
ATTORNEYS.

No. 673,431. Patented May 7, 1901.
H. FREDRICK.
WATER METER.
(Application filed Mar. 28, 1900.)

(No Model.) 3 Sheets—Sheet 3.

WITNESSES:
Henry Krug
Russell M. Everitt

INVENTOR
Henry Fredrick,
BY
Drake & Co.
ATTORNEYS.

UNITED STATES PATENT OFFICE.

HENRY FREDRICK, OF NEWARK, NEW JERSEY.

WATER-METER.

SPECIFICATION forming part of Letters Patent No. 673,431, dated May 7, 1901.

Application filed March 28, 1900. Serial No. 10,426. (No model.)

*To all whom it may concern:*

Be it known that I, HENRY FREDRICK, a citizen of the United States, residing at Newark, in the county of Essex and State of New Jersey, have invented certain new and useful Improvements in Water-Meters; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to that class of water-meters described and shown in my prior application, Serial No. 709,454, filed March 17, 1899, and allowed November 16, 1899, the objects of the present improvements being to secure a more simple construction, to obtain a more delicate and sensitive meter which will measure a finer stream of water, to provide for a more positive transmission of motion, and thus secure greater accuracy of measurement, and to secure other advantages and results, some of which may be referred to hereinafter in connection with the description of the working parts.

The invention consists in the improved water-meter and in the arrangements and combinations of parts of the same, all substantially as will be hereinafter set forth and finally embraced in the clauses of the claim.

Figure 1:
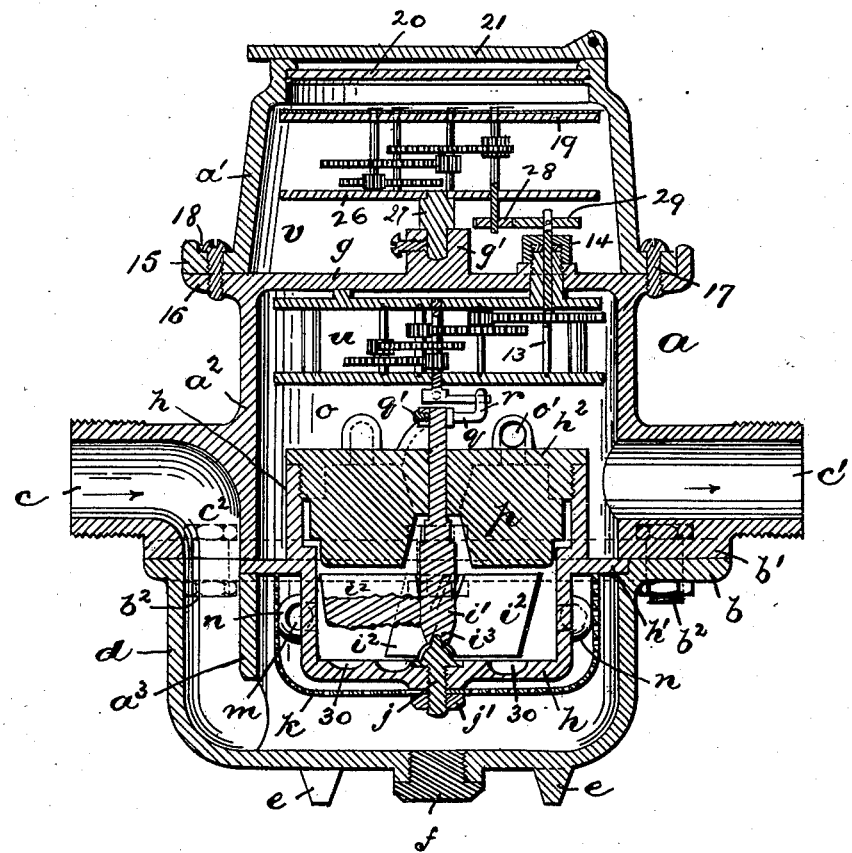
Figure 2:
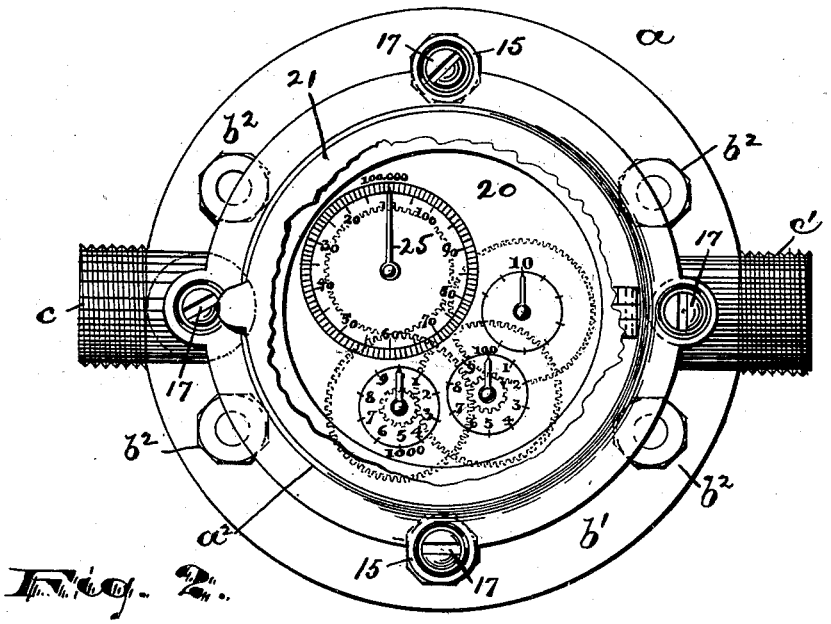
Figure 3:
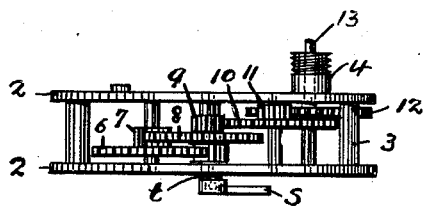
Figure 4:
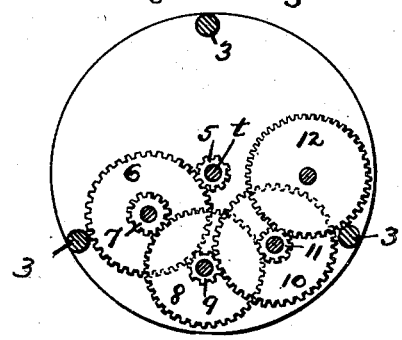
Figure 5:
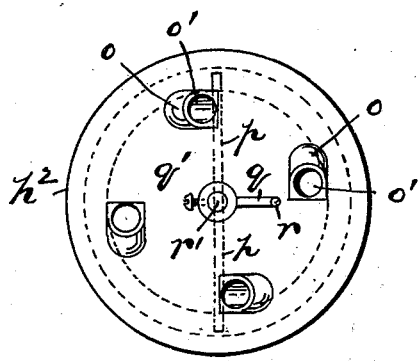
Figure 8:
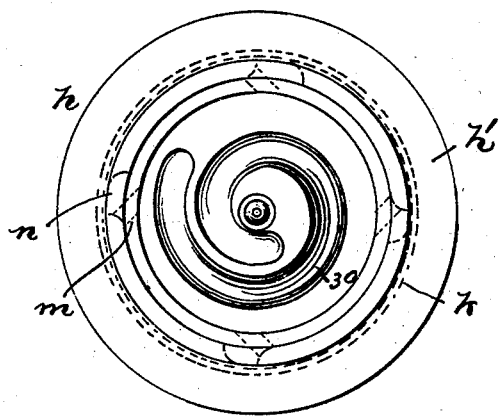
Figure 6:
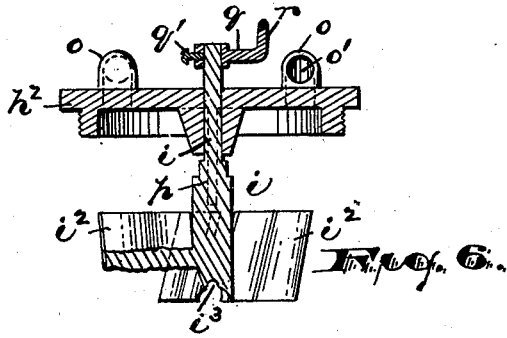
Figure 9:
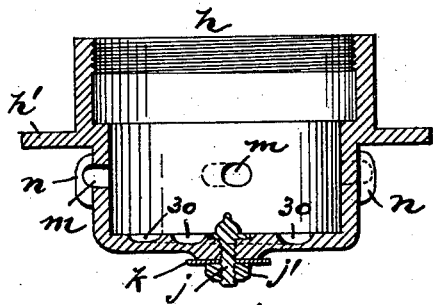
Figure 7:
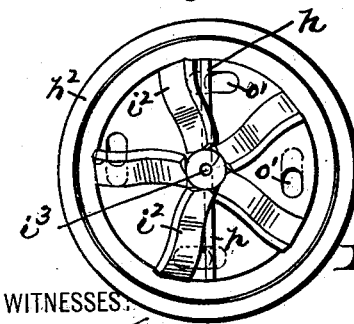
Figure 10:
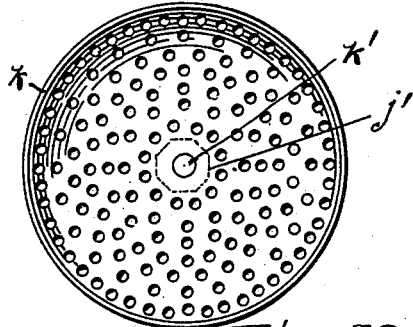

Referring to the accompanying drawings, in which like characters of reference indicate corresponding parts in each of the several views, Figure 1 is a vertical central section of my improved meter. Fig. 2 is a plan view, the protecting-cover being broken away to show the reading-dials beneath. Fig. 3 is a side view of a certain intermediate reducing-gearing located above the water-wheel, and Fig. 4 is a plan view of the same. Fig. 5 is a plan view of the top plate of the water-wheel chamber. Fig. 6 is a central vertical section of the same and showing the water-wheel, and Fig. 7 is a reverse plan of said top plate and water-wheel in their normal relations. Fig. 8 is a plan view of the water-wheel chamber with said top plate and water-wheel removed, and Fig. 9 is a central vertical section of the same. Fig. 10 is a plan view of a strainer which incloses the bottom of the water-wheel chamber.

In said drawings, $a$ indicates the body of the meter, said body comprising top, bottom, and middle castings $a'$ $a^2$ $a^3$, forming an approximately cylindrical body interiorly hollowed out. The bottom and middle castings $a^3$ and $a^2$ are outwardly flanged at their meeting ends, as at $b$ $b'$, and bolts $b^2$ are passed through said flanges, whereby the two castings may be imperviously joined, as is common in pipe connections. The middle casting $a^2$ has diametrically opposite inlet and outlet nozzles $c$ $c'$ projecting from the body of the meter in the same horizontal line and exteriorly threaded at their extremities to receive water-pipe connections. By thus having the inlet and outlet nozzles in line the meter is more easily and quickly connected up or put in position, as will be understood by one skilled in the art.

The flow-passage of the outlet-nozzle $c'$ opens directly into the middle casting $a^2$; but the flow-passage of the inlet $c$ turns downward outside of the wall of the middle casting $a^2$, as at $c^2$, and opens through the flange $b'$, this opening registering with a similar opening through the lower flange $b$ of a tubular extension $d$ on the outside of the bottom casting $a^3$, the flow-passage continuing downward through said extension and opening into the bottom casting $a^3$ at its lowest point.

The closed bottom of the lowest casting $a^3$ may be provided on the outside with legs $e$, upon which the meter stands, and a removable plug $f$ may be placed in said bottom to enable the meter to be cleaned out.

The top of the middle casting $a^2$ is closed by a horizontal partition $g$, and thus the bottom and middle castings when connected form a closed water-chamber, to which entrance is had through the nozzle $c$ and exit by the nozzle $c'$. Said closed water-chamber contains the water-wheel box $h$ at its lower part and the intermediate reducing-gearing $u$ at its upper part. Said water-wheel box $h$ comprises a cup-like casting interiorly hollowed out to receive the water-wheel and having an exterior horizontally-projecting flange $h'$, which is adapted to fit nicely in a recess therefor in the upper edge of the wall of the bottom casting $a^3$ and be flush at its upper surface with the flange $b$, to receive upon itself the flange $b'$ of the middle casting and be held in place thereby.

Within the water-wheel box $h$ is the water-wheel $i$, comprising a vertical shaft $i'$ and wings or blades $i^2$. Said wings or blades extend radially out from the vertical shaft and are preferably plane, although they may be curved or bent in edge view, as shown in Fig. 7. The ends of the blades all terminate in a vertical cylindrical surface concentric with the walls of the water-wheel chamber and very closely adjacent thereto. The lower edges of the blades are also very close to the floor of the chamber, and thus not even a very fine stream of water can get around the wheel $i$ or pass it without striking the blades. Furthermore, the blades do not stand in vertical planes passed through the central axis $i'$, but are twisted slightly, so that their planes intersect the shaft $i'$ at a small angle. This twisting of each blade is such that the upper edge of the blade is carried ahead or in the direction in which the wheel rotates, and thus when the water strikes said blades it is deflected toward the upper exit-openings $o'$, hereinafter described, without a sharp turn in direction.

The bottom end of the axis $i'$ of the water-wheel is recessed, as at $i^3$, to receive a pivotal stud or pin $j$, screwed into the floor of the chamber or otherwise firmly secured. Preferably a nut $j'$ is screwed upon the lower protruding end of the stud $j$, and this nut also serves to hold in place a cup-like strainer-plate $k$, which incloses the lower end of the water-wheel box $h$ and abuts at its upper edges against the flange $h'$. Said strainer-plate is centrally apertured at the bottom to pass over the lower protruding end of the stud $j$, and the rest of the plate is finely perforated to permit water to pass, but prevent particles of foreign matter getting into the water-wheel chamber.

Inside the strainer $k$ and at a height about equal to the height of the middle of the blades $i^2$ apertures $m$ are provided in the walls of the water-wheel box $h$ to enable water to pass to the wheel. These apertures are disposed tangentially with relation to the vertical axis of the water-wheel and its chamber, so that the water enters at an angle to the radial blades of the water-wheel and impinges upon said blades with greater force and directness. The outer ends or mouths of said apertures lie either partially or wholly in the radial wall of bosses $n$, formed on the outside of the water-wheel box $h$, and thus the inflowing water is directed to the water-wheel with a minimum loss of force.

The top of the water-wheel box $h$ is closed by a cover $h^2$, which screws into the top of the box and is thus firmly and imperviously secured. On the top of said cover are bosses $o$, similar to those before described as on the sides of the box $h$, said bosses being arranged on a circle about over the middle of the blades and having exit-passages $o'$ opening out through their vertical walls, whereby the water after acting on the wheel escapes from the chamber. These passages $o'$ are inclined in the direction of the rotary current turning the water-wheel, and thus the water more easily escapes to the main chamber of the meter and so to the exit-nozzle $c'$. Furthermore, since the mouths of the exit-passages $o'$ lie in the side walls of the bosses $o$ of the cover $h^2$ any back rush of water from the service-faucet does not directly strike the water-wheel blades, but loses its force in the tortuous turns given it, and so the water-wheel is comparatively unaffected. The cover $h^2$ provides at its center a bearing for the vertical shaft $i'$ of the water-wheel, and at the sides of said shaft the cover has depending wings $p$, which extend vertically downward to a plane closely adjacent to the upper edges of the water-wheel blades. These wings $p$ prevent any ineffectual circulation of the water above the water-wheel such as tends to interfere with an accurate registration and by arresting the rotary movement of the water produce a back pressure on the fan-wheel blades, which reduces the velocity of the fan-wheel. It will be noted that in my construction the wings $p$ reach across the fan-wheel box from side wall to side wall, said side walls being closed and the ends of the wings terminating very close to said walls. This prevents any lateral escape of the dammed water at the ends of the wings, and said water must pass ahead over the wings and escape through the cover $h^2$ in a line perpendicular to the fan-wheel blades and wings $p$, the exit-openings in the cover being disposed between the wings depending therefrom. A back pressure of maximum effectiveness is thus secured and increased sensitiveness and accuracy obtained in the meter.

The upper end of the water-wheel axis $i'$, which projects above the chamber or box $h$, carries a fixed radial arm $q$, which is secured in place by a set-screw $q'$. The outer end of this arm is bent upward, as at $r$, and is adapted to engage as the arm rotates a parallel arm $s$, projecting from a shaft $t$ of the intermediate gearing $u$, said shaft being in line with the axis $i'$ of the water-wheel. This connection of the water-wheel with the intermediate gearing not only permits a ready separation of the parts in dismembering the meter, but also affords a positive transmission of motion.

The intermediate gearing $u$, the purpose of which is to reduce the speed of motion transmitted to the indicating mechanism, is arranged between plates 2 2, held in proper position by studs 3, the whole being supported at the top of the meter-chamber formed by the bottom and middle castings $a^3$ $a^2$ by a hollow stud 4, which passes up through the top plate $g$ of the middle casting. Said gearing preferably consists, as shown, of the small pinion 5 on the shaft $t$ and meshing into the large gear-wheel 6. This gear-wheel carries a small pinion 7, which meshes into a second large wheel 8, having a pinion 9, which in turn engages a third large wheel 10, whose final pinion 11 engages with a large wheel 12, fast on the shaft 13, extending up through the hollow stud 4 to the indicating mechanism. Said shaft 13 where it passes through the top $g$ is provided in any suitable manner with packing to prevent leakage of water into the upper chamber $v$ for indicating mechanism, the cap 14 of the packing-box screwing upon the end of the stud 4 to hold the same against withdrawal.

The uppermost section $a'$ of the meter contains the indicating mechanism, and said section at its lower end sits upon the top of the middle section $a^2$, coinciding lugs 15 16 on the two sections receiving screw-bolts 17, which fasten the parts together. One or more of said screw-bolts has its head adapted to lie in a recess 18, which can be filled with sealing-wax and receive an official stamp to guard against tampering, as shown in my prior application.

The reading-dial 19 is disposed at the top of the chamber, and above it is the usual glass plate 20 and hinged protecting-cover 21. I prefer to use the form of dial shown in Figs. 1 and 2, having three small hands registering units, tens, and hundreds, respectively, and one large hand 25, which registers the thousands. This form of meter is more easily read by the consumer, and is therefore preferable; but it will be understood that any other form may be used.

The indicating-hands are actuated by suitable proportionate gears in the usual manner, said gears being supported between the dial-plate and a base-plate 26, the latter having a central leg 27, by which the whole is removably supported in a socket $g'$ on the plate $g$. Gear-wheels 28 29 transmit motion from the shaft 13 of the intermediate gearing to the indicating-hands.

In the floor of the water-wheel box or chamber $h$ I prefer under certain conditions to form a groove 30, spirally arranged around the center and having its two ends gradually diminishing in depth to merge into the plane floor of the chamber. This groove is adapted to receive and contain any few small particles of sand or the like which may have passed the strainer-plate $k$ and which are still large enough to interfere with the revolving blades as they lie on the floor. The groove 30 affords space for these disturbing particles, and thus facilitates an accurate registration. To prevent the walls of the groove from forming positive obstructions to the water and thence to the rotating blades traveling immediately over the grooves, I have formed the grooves spirally, as above indicated, or so that the side walls will not lie at right angles to the line of movement of the blades.

The stud $j$, upon which the water-wheel sits, I prefer to make, as shown, very short in comparison to the height of the water-wheel or of the blades, so that rattling or loose lateral movement of the wheel on its pivot in action is prevented.

Having thus described the invention, what I claim as new is—

1. The herein-described water-meter, comprising a body portion having top, bottom and middle castings suitably flanged and bolted together, the top casting forming a chamber for indicating mechanism, and the bottom and middle castings together forming a fluid-chamber, outlet and inlet nozzles at opposite sides of the middle casting in line with each other, the passage of said outlet-nozzle opening directly from the fluid-chamber, and the passage of the inlet-nozzle extending downward outside the walls of the castings and opening into the lower part of the fluid-chamber, a fan-wheel box transversely dividing the fluid-chamber and having its lower end of smaller diameter than the chamber and provided with tangential inlets through the sides, the walls of said box from its lowest point of engagement with the walls of the fluid-chamber upward being imperviously closed, a tight-fitting cover for the box having depending wings on the inner surface and having outlet-passages through the cover between said wings, a fan-wheel pivoted in the box, and indicating mechanism in operative connection therewith, substantially as set forth.

2. In a water-meter, the combination with a body portion providing a main water-chamber having opposite inlet and outlet nozzles, of a water-wheel box or chamber separating one end of said main chamber from the other, said box having tangentially-disposed passages through its walls whose mouths lie in the radial walls of protuberances or bosses on the outer walls of the box, inclined escape-passages in the top of said box, and a water-wheel pivoted in the box and having its blades or wings inclined upwardly from the inflow-passages toward the escape-passages, whereby an even and smooth forward motion of the current is maintained at all times, substantially as set forth.

3. The combination with the herein-described water-meter providing a main water-chamber, of a water-wheel box suspended transversely in said chamber, and being provided with inlet and outlet openings near its bottom and top, respectively, and a water-wheel pivoted in said box and having its wings or blades closely approaching the walls and the bottom of the box, the said box having a groove or recess in its floor beneath the said wheel which in plan crosses the radii of the wheel-axle so as not to form right-angular obstructions to the water and wheel wings or blades as the latter revolve or rotate, said groove being adapted to contain particles of matter which would otherwise interfere with said wheel, substantially as set forth.

4. In a water-meter, the combination of the herein-described water-wheel box having inlet and outlet openings at its bottom and top respectively, a water-wheel pivoted in said box, a stud $j$, upon which said wheel is pivoted, said stud extending through the bottom of the box, a strainer-plate held upon said stud and inclosing the lower part of the box, and a spiral groove or recess in the floor of the box beneath the water-wheel, substantially as set forth.

5. In a water-meter, the combination with a fan-wheel, of a fan-wheel box inclosing said fan-wheel and having a closed bottom and walls closed with the exception of inlet-passages opposite the fan-wheel, a tight-fitting cover for said fan-wheel box having on its under side depending wings whose lower edges are adjacent to the upper edges of the fan-wheel blades and whose outer ends closely approach the imperforate upper part of the walls of the box, and said cover having exit-passages for water between said wings, substantially as set forth.

6. The herein-described water-meter having a main water-chamber and diametrically oppositely disposed inlet and outlet nozzles, said inlet-nozzle communicating by its passage with the lower part of the chamber and said outlet-nozzle leading from the top of the chamber, a water-wheel box transversely dividing said chamber and having tangential openings in its walls near the bottom and inclined openings in its top, a cup-like strainer inclosing the lower part of said water-wheel box, a water-wheel pivoted in said box and having twisted or inclined blades sloping from the inlet to the outlet openings, said blades having their lower edges and outer ends closely adjacent to the floor and walls of the box, and the floor or bottom of the box having a spirally-disposed dirt groove or recess beneath the water-wheel blades, and vertical radial wings depending from the top of the box to the plane of the upper edges of the water-wheel blades, substantially as set forth.

7. The herein-described water-meter, comprising a body portion formed of top, bottom and middle sections, said top section forming a chamber for indicating mechanism and said middle and bottom sections together forming an independent water-chamber, outlet and inlet nozzles disposed on the middle section at diametrically opposite points, the outlet-passage opening into the top of the water-chamber and the inlet-passage being bent downward and entering the bottom of said chamber, a fixed water-wheel box transversely closing said water-chamber intermediate of its ends and having in its sides and near the lower end tangentially-disposed inlet-passages opening through the radial walls of external bosses, and having inclined escape-openings in its top, a cup-shaped strainer inclosing the lower end of the water-wheel box, a water-wheel pivoted within said box and having an upwardly-projecting shaft and blades which are closely adjacent at their lower edges and ends to the floor and walls of the box, said floor of the box having a spiral groove therein to receive dirt and the like, and the cover of the box having depending wings extending vertically downward to the upper edges of the water-wheel blades, a pivotal stud for the water-wheel set into the floor of the water-wheel box and projecting below the bottom of the box to receive the said strainer and a nut holding the same in place, intermediate gearing in the top of the water-chamber and receiving motion from the water-wheel shaft and suitable indicating mechanism in the upper independent chamber and receiving motion from the said intermediate gearing, substantially as set forth.

8. In a water-meter, the combination with a body portion providing a fluid-chamber, of a fan-wheel box transversely dividing said chamber and below the plane of division having inlet-passages, a fan-wheel in said box, and an imperviously-fitting cover closing the top of the box and having on its under surface depending wings, the upper part of the fan-wheel box having closed walls and the cover being provided with outward protuberances through which inclined outlet-passages open from between the wings, substantially as set forth.

9. In a water-meter, the combination with a body portion having a fluid-chamber with inlet and outlet nozzles, of a fan-wheel box transversely dividing said chamber, said box having below the plane of division inlet-passages for water and above said plane having closed walls, a fan-wheel pivoted in the lower part of said box, and a cover for closing the top of the box, said cover having depending wings on the under surface and having outlet-passages up through the cover between said wings, substantially as set forth.

10. In a water-meter, the combination with the fan-wheel box or inclosure having inflow and outflow passages and a spiral groove formed in its bottom, of a fan-wheel disposed in said box over said spiral groove, and an indicating mechanism in connection with said fan-wheel, substantially as set forth.

11. In a water-meter, the combination with the fan-wheel and its connections, of a fan-wheel box having in its floor a spiral groove 30, gradually diminishing in depth toward its opposite ends, and across which the blades of the fan-wheel lie transversely in all their positions, said box having inlet and outlet passages, and indicating mechanism actuated by said fan-wheel and its connections, substantially as set forth.

12. In a water-meter, the combination with a fan-wheel box having inlet-openings in its walls, and having a removable cover provided with outlet-openings and wings projecting from its under side downward to or near to the plane of the fan-wheel, and said box having in its floor a spiral recess, of a fan-wheel pivoted in said box and having its blades closely approaching at their upper and lower edges the said wings and floor of the box, respectively, and at their ends the walls of the box, indicating mechanism, and means transmitting motion from said wheel to said indicating mechanism, substantially as set forth.

13. In a water-meter, the combination of an outer casing providing an upper chamber for indicating mechanism and a lower chamber adapted to contain the fan-wheel box and intermediate gearing, the said lower chamber of the casing being formed by flanged castings adapted to be bolted together and the upper of said castings having diametrically opposite inlet and outlet nozzles, the passage of the latter opening directly into the chamber and the passage of the former bending downward and opening into the chamber through the bottom casting, a covered fan-wheel box suspended in the chamber by means of an annular peripherally-projecting flange held between the flanged castings and dividing the said chamber, said box having inlet-openings in its walls below the supporting-flange and outlets on its cover, and the water passing from the inlet-nozzle through the fan-wheel box to the outlet-nozzle, a fan-wheel inclosed in said box, intermediate gearing above said box and indicating mechanism, substantially as set forth.

14. In a water-meter, the combination with an outer casing providing a fluid-chamber, and having inlet and outlet nozzles, said casing being in sections on a transverse plane and adapted to be bolted together, of a fan-wheel box having a peripheral flange gripped between the sections of the outer casing and supporting the box, said box having inlet-passages beneath said flange and closed walls above, a cover fitting the top of said box and having on the inside depending wings and on the outside protuberances presenting perpendicular walls, said cover being perforated by inclined outlet-passages opening through the perpendicular walls of the protuberances, and a fan-wheel in said box, substantially as set forth.

In testimony that I claim the foregoing I have hereunto set my hand this 22d day of March, 1900.

HENRY FREDRICK.

Witnesses:
CHARLES H. PELL,
C. B. PITNEY.